United States Patent
Wang et al.

(10) Patent No.: US 10,755,114 B1
(45) Date of Patent: *Aug. 25, 2020

(54) EFFICIENT TWO-STAGE OBJECT DETECTION SCHEME FOR EMBEDDED DEVICE

(71) Applicant: Ambarella International LP, Santa Clara, CA (US)

(72) Inventors: Yu Wang, San Jose, CA (US); Leslie D. Kohn, Saratoga, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,143

(22) Filed: Apr. 4, 2019

Related U.S. Application Data

(63) Continuation of application No. 15/692,253, filed on Aug. 31, 2017, now Pat. No. 10,311,311.

(51) Int. Cl.
*G06K 9/00* (2006.01)
*G06K 9/62* (2006.01)
*G06K 9/32* (2006.01)
*G06K 9/46* (2006.01)

(52) U.S. Cl.
CPC ....... *G06K 9/00791* (2013.01); *G06K 9/3241* (2013.01); *G06K 9/4642* (2013.01); *G06K 9/6282* (2013.01)

(58) Field of Classification Search
CPC ............. G06K 9/00791; G06K 9/4642; G06K 9/3241; G06K 9/6282
See application file for complete search history.

(56) References Cited

U.S. PATENT DOCUMENTS

| | | | |
|---|---|---|---|
| 9,092,695 B1* | 7/2015 | Ogale | G06K 9/6202 |
| 2013/0294516 A1* | 11/2013 | Guduru | H04N 19/61 375/240.16 |
| 2014/0139633 A1* | 5/2014 | Wang | G06K 9/00778 348/46 |
| 2015/0195236 A1* | 7/2015 | Nie | H04L 63/02 726/11 |
| 2015/0332104 A1* | 11/2015 | Kapach | G06K 9/6202 382/104 |
| 2016/0162761 A1* | 6/2016 | Bulan | G06K 9/00456 382/104 |
| 2016/0343144 A1* | 11/2016 | No | G06K 9/6256 |
| 2016/0343146 A1* | 11/2016 | Brown | G06T 7/246 |
| 2017/0206426 A1* | 7/2017 | Schrier | G06K 9/6273 |
| 2018/0000428 A1* | 1/2018 | Swiston | A61B 5/7282 |
| 2018/0096224 A1* | 4/2018 | Fua | G06K 9/6274 |

* cited by examiner

*Primary Examiner* — Amara Abdi
(74) *Attorney, Agent, or Firm* — Christopher P. Maiorana, PC

(57) ABSTRACT

An apparatus comprises a detector and a processor. The processor may be configured to perform a two-stage object detection process utilizing the detector circuit. The detector circuit may be configured to implement a simple detection stage and a complex detection stage. In the simple detection stage, a first type of object detection is applied to each image in a search space and a number of candidates are identified by applying a first non-maximum suppression technique. In the complex detection stage, a second type of object detection is applied to the candidates identified by the simple detection stage.

20 Claims, 11 Drawing Sheets

220

222
GENERATE SCORE MAP FOR EACH SCALED VERSION OF CAPTURED IMAGE USING FIRST STAGE DETECTOR

↓ DETECTED OBJECTS

224
APPLY NON-MAXIMUM SUPPRESSION TO SCORE MAPS

↓ CANDIDATES/PROPOSALS

226
GENERATE ESTIMATES OF LOCATION AND SCALE OF BOUNDING BOXES OF OBJECTS USING CANDIDATES/PROPOSALS AND SECOND STAGE DETECTORS

↓ ESTIMATES OF LOCATION AND SCALE OF BOUNDING BOXES

228
APPLY STANDARD NON-MAXIMUM SUPPRESSION

FIG. 6

EFFICIENT TWO-STAGE OBJECT DETECTION SCHEME FOR EMBEDDED DEVICE

This application relates to U.S. Ser. No. 15/692,253, filed Aug. 31, 2017, which is incorporated by reference in its entirety.

FIELD OF THE INVENTION

The invention relates to computer vision generally and, more particularly, to a method and/or apparatus for implementing an efficient two-stage object detection scheme for an embedded device.

BACKGROUND

A process for finding and localizing instances of objects of particular classes (e.g. car, pedestrian, cyclist) from an image is generally referred to as object detection. Object detection is a challenging task with significant applications such as autonomous driving. A majority of existing state-of-the-art detectors are learning based and formulate the detection of objects as a classification problem.

A common approach is to apply a sliding window over an image, construct a feature vector from the sliding window, and then classify the feature as either an object or background. Typically, the sliding window has a predefined fixed size. A detection model, such as Boosting, can be trained based on feature representations of the fixed-size windows. To detect objects of different scales, the image is re-scaled to many levels to form an image pyramid or scale space. Applying the trained detection model for canonical scale on a resized image is equivalent to detection on a different scale.

During detection, the trained detector searches a very large number of possible locations and scales at which the objects might occur. Exploring such a big search space is a daunting task, especially for resource-limited embedded systems or mobile devices.

It would be desirable to implement an efficient two-stage object detection scheme for an embedded device.

SUMMARY

The invention concerns an apparatus comprising a detector and a processor. The processor may be configured to perform a two-stage object detection process utilizing the detector circuit. The detector circuit may be configured to implement a simple detection stage and a complex detection stage. In the simple detection stage, the two-stage object detection process comprises applying a first detector over a predefined region of interest. In the complex detection stage, the two-stage object detection process comprises applying a second detector on a set of best candidates identified by the simple detection stage.

BRIEF DESCRIPTION OF THE FIGURES

Embodiments of the invention will be apparent from the following detailed description and the appended claims and drawings in which:

FIG. 6 is a flow diagram illustrating an example two-stage detection scheme in accordance with an example embodiment of the invention;

DETAILED DESCRIPTION OF THE EMBODIMENTS

Embodiments of the present invention include providing an efficient two-stage object detection scheme for an embedded device that may (i) provide accuracy similar to running a complex detector over a region of interest, (ii) provide performance significantly better than running the complex detector over the region of interest, (iii) be applied to any sliding-window based object detector, (iv) be applicable to any object categories, (v) utilize a diamond-shaped region for non-maximum suppression, (vi) use search windows on each level(scale) of an image pyramid search space corresponding to the same or different regions of interest on other levels(scales), and/or (vii) be implemented as a combination of hardware and software in one or more integrated circuits.

In various embodiments, a two-stage object detection scheme is described. The two-stage object detection scheme is embedded device friendly. The two-stage object detection scheme achieves significant algorithmic speed-ups over existing methods while maintaining comparable performance. The two-stage object detection scheme is broadly applicable to any sliding-window based object detectors. The two-stage object detection scheme generally applies two object detectors of different complexity in two separate stages.

In various embodiments, a first detection stage generally employs a small and simpler detector with low computational cost to prune a majority of easy false positives. The first detection stage generally reduces a search space substantially. A second detection stage generally employs a more powerful detector that rejects the remaining difficult negative proposals and improves the true positive proposals in terms of both classification score and bounding box localization accuracy. The second detection stage is generally very efficient since the more powerful detector is applied to only a small set of search locations.

The two-stage object detection scheme in accordance with example embodiments of the invention generally works with any sliding-window object detector and/or object category. In an example, a baseline object detector based on the Aggregated Channel Features (ACF) and Boosting tree classifier with an application to pedestrian detection may be used to illustrate the two-stage object detection scheme in accordance with example embodiments of the invention.

A sliding-window based Non-Maximum Suppression (NMS) method is also described to convert the detection result of the first detection stage into a set of candidate/proposal windows. In an example, the sliding window based NMS method may employ a diamond shaped suppression region. In general, the set of candidate/proposal windows resulting from the first detection stage may comprise a number of candidates/proposals that is much smaller than the original search space. In an example, the set of candidate/proposal windows may comprise on the order of 100 candidates/proposals.

Figure 1:
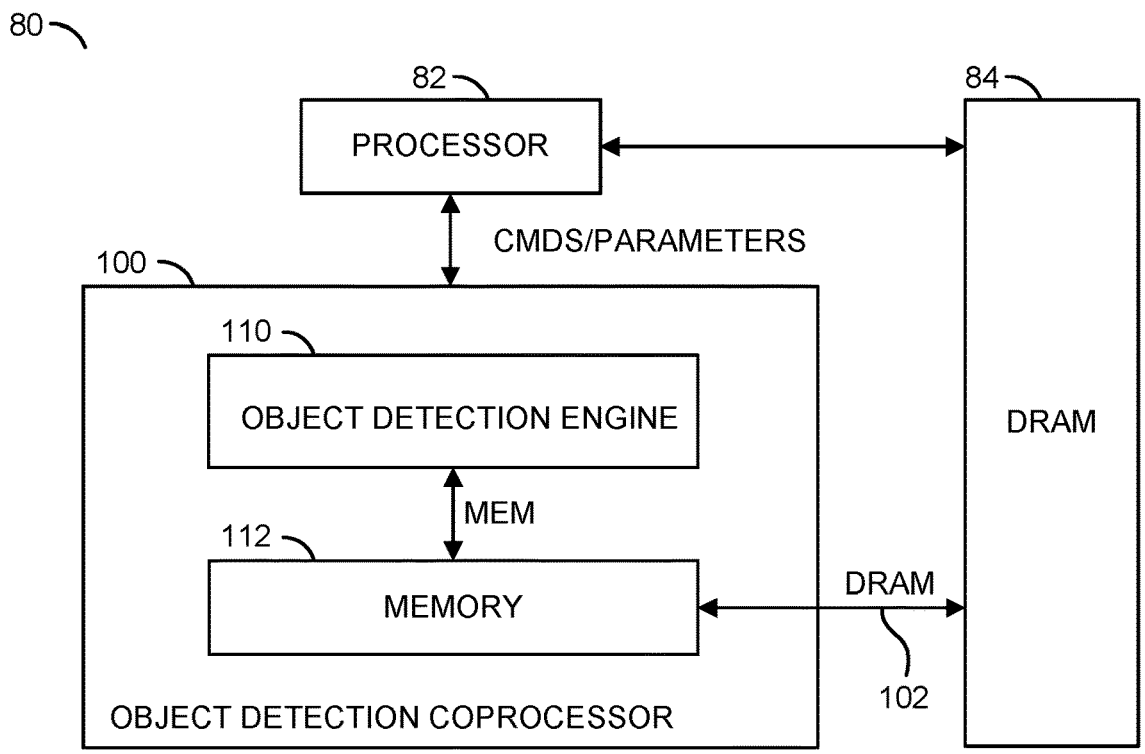
FIG. 1 is a diagram illustrating a context of an example implementation of a two-stage object detection technique in accordance with an example embodiment of the invention.

Referring to FIG. 1, a diagram of a system 80 is shown illustrating a context of an example implementation of a two-stage object detection technique in accordance with an embodiment of the invention. In an example, the system (or apparatus) 80 may be implemented as part of a computer vision system, an automated driver assistance system, and/or an autonomous vehicle system. In various embodiments, the system 80 may be implemented as part of a camera, a computer, a server (e.g., a cloud server), a smart phone (e.g., a cellular telephone), a personal digital assistant, or the like.

In an example embodiment, the system 80 generally comprises a block (or circuit) 82, a block (or circuit) 84, and a block (or circuit) 100. The circuit 82 may implement a processor circuit. In some embodiments, the processor circuit 82 may be a general purpose processor circuit. The processor circuit 82 may be operational to interact with the circuit 84 and the circuit 100 to perform various processing tasks. The circuit 84 may implement a dynamic random access memory (DRAM) circuit. The DRAM circuit 84 is generally operational to store multidimensional arrays of input data elements and various forms of output data elements. The DRAM circuit 84 may exchange the input data elements and the output data elements with the processor circuit 82 and/or the circuit 100. A signal (e.g., DRAM) may be exchanged between the circuit 84 and the circuit 100 (e.g., via a memory bus 102). The signal DRAM may transfer data between the circuits 84 and 100. In an example, the DRAM circuit 84 may store image data of an image pyramid search space.

In an example, the circuit 100 may be configured to perform a two-stage object detection process in accordance with an example embodiment of the invention in response to one or more commands and or parameters and using image data from the DRAM circuit 84. In an example, the processor 82 may be configured to implement the two-stage object detection process in accordance with an example embodiment of the invention by providing appropriate commands and/or parameters to the circuit 100.

In an example, the circuit 100 may be implemented as a coprocessor circuit. The coprocessor circuit 100 generally implements an object detection engine that includes its own dedicated memory, data paths, and memory interface. In an example embodiment, the coprocessor circuit 100 may be operational to work on a single level of either a simple object detector (e.g., a 2 level classifier) or a complex object detector (e.g., a 5 level classifier) of the two-stage object detection process in accordance with example embodiments of the invention. The two-stage object detection process may be implemented via software running on the processor 82.

In some embodiments, the coprocessor circuit 100 may be implemented solely in hardware. In other embodiments, the coprocessor circuit 100 may be implemented as a combination of software (or firmware) and hardware. In some embodiments implementing a combination of software and hardware, the coprocessor circuit 100 may be implemented as an embedded processor and a computer readable medium embodying computer executable instructions, which when executed by the embedded processor cause the embedded processor to perform a two-stage object detection process in accordance with an example embodiment of the invention.

In an example, the coprocessor circuit 100 may implement one level processing of selected regions in multiple scales or levels (e.g., of an image pyramid search space). The coprocessor circuit 100 may have options for selecting the simple detector or the complex detector. In an example, one type of classifier may be loaded to the coprocessor circuit 100 at a time. In an example, the coprocessor circuit 100 may be configured (e.g., by the processor 82) to perform either aggregated channel features (ACF) 2 level boosted or locally decorrelated channel features (LDCF) plus 5 level boosted detectors. However, other detectors or classifiers may be implemented accordingly to meet the design criteria of a particular application.

In an example, the coprocessor circuit 100 may be configured to output scores for candidates after non-maximum suppression (NMS) processing that have scores above a software (or parameter) specified threshold. In an example, the threshold may be specified by the processor 82. In an example, the coprocessor circuit 100 may perform a sliding window related non-maximum suppression process using a diamond shaped suppression region during the first stage of the two-stage object detection process.

In an example, software may be configured to implement the two pass object detection process by having the coprocessor circuit 100 perform the first pass with the ACF/2 level detector (classifier), selecting the best results with a first non-maximum suppression step, and then having the coprocessor circuit 100 perform the LDCF/5 level classifier around each of the best results. The second non-maximum suppression step may be performed by software running on the processor 82 rather than the coprocessor circuit 100. In various embodiments, some functions may be moved between hardware and software. In an example, the hardware may be configured to process only one scale at a time, and the software may be configured to give commands to process each scale. In another example, the hardware may be configured to perform the entire processing scheme with a single command, at a cost of less flexibility in the software.

Another tradeoff that may be made is a number of classifiers processed by a particular implementation. In an example, the coprocessor circuit 100 may be configured to provide only one type of object detection at a time. Alternatively, the circuit 100 may be configured to perform processing of a multiple (e.g., 2, 5, 100, 332, etc.) different classifiers to the sliding window to allow different types of objects to be detected in the same pass. In another example, a special purpose processor may be implemented that executes the entire two-stage object detection process in software on a general purpose processor.

In an example, the circuit 100 may comprise a circuit (or module) 110 and a circuit (or module) 112. The circuit 110 may implement an object detection engine. The circuit 112 may implement a memory circuit. The object detection engine 110 may be configured to perform the each stage of the two-stage object detection process in accordance with example embodiments of the invention. The memory circuit 112 may be configured to store all, a portion, or portions of the input data elements and output data elements utilized and/or generated by the object detection engine 110. The input data elements may be received from the DRAM circuit 84 via the memory bus 102. The output data elements may be sent to the DRAM circuit 84 via the memory bus 102.

Figure 2:
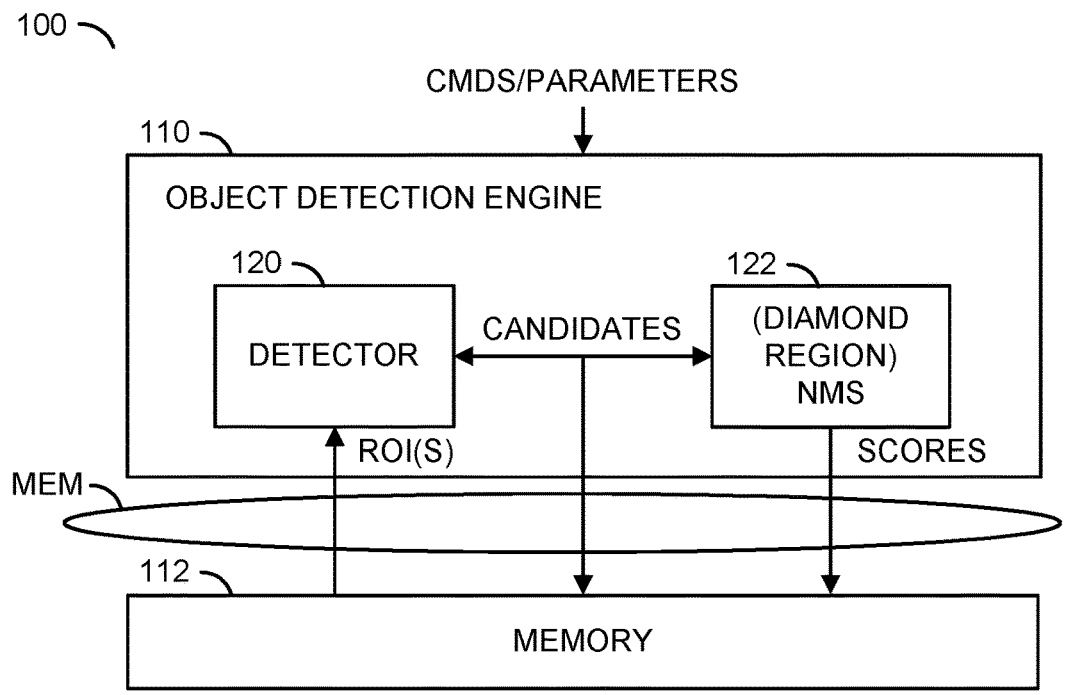
FIG. 2 is a diagram illustrating a generic implementation of an example object detection engine of FIG. 1.

Referring to FIG. 2, a diagram is shown illustrating a generic implementation of an example object detection engine in accordance with an example embodiment of the invention. In an example, the circuit 110 may implement an object detection scheme in accordance with an example embodiment of the invention. In an example, the circuit 110 may be configured to generate scores for object candidates (e.g., SCORES) for one or more regions of interest (e.g., ROI(s)) in response to a number of commands and/or parameters (e.g., CMDS/PARAMETERS). In an example, the CMDS/PARAMETERS may be configured to specify a type of detector, non-maximum suppression thresholds, and/or classifier to be applied to the region(s) of interest. The region of interest data and scores for object candidates may be exchanged with the memory 112 via a signal MEM.

In various embodiments, the circuit 110 may comprise a circuit (or module) 120 and a circuit (or module) 122. The circuit 120 may implement an object detection process in accordance with an example embodiment of the invention. The circuit 122 may implement a non-maximum suppression technique in accordance with an example embodiment of the invention. In an example, the circuit 120 may apply a selected first (simple) detector over one or more regions of interest (ROIs) as part of the first stage of the two stage object detection process. Then, in the second stage, the circuit 120 may apply a selected second (complex) detector on the best candidates from the first stage. In an example, the circuit 120 may implement processing of selected regions in multiple scales (or levels) of an image pyramid search space. In another example, the circuit 120 may implement processing of selected regions in a single scale (or levels). In an example, the circuit 120 may be configured to provide only one type of object detection at a time. Alternatively, the circuit 120 may be configured to perform processing of multiple (e.g., 2, 5, 100, 332, etc.) different classifiers to a sliding window to allow different types of objects to be detected in the same pass.

In the first stage, the circuit 122 may apply a non-maximum suppression (NMS) technique to results of the first stage detector. In an example, the NMS technique performed by the circuit 122 may utilize a diamond shaped suppression region. In some embodiments, the candidates from the second stage detector may be sent to the memory 112 for further processing by the processor 82. In other embodiments, the circuit 122 may be configured to apply a second non-maximum suppression (NMS) step to the results of the second stage detector. In an example, the second NMS step may utilize a standard NMS technique. In another example, the same NMS technique may be applied to the results from both stages of the object detection process.

Figure 3:
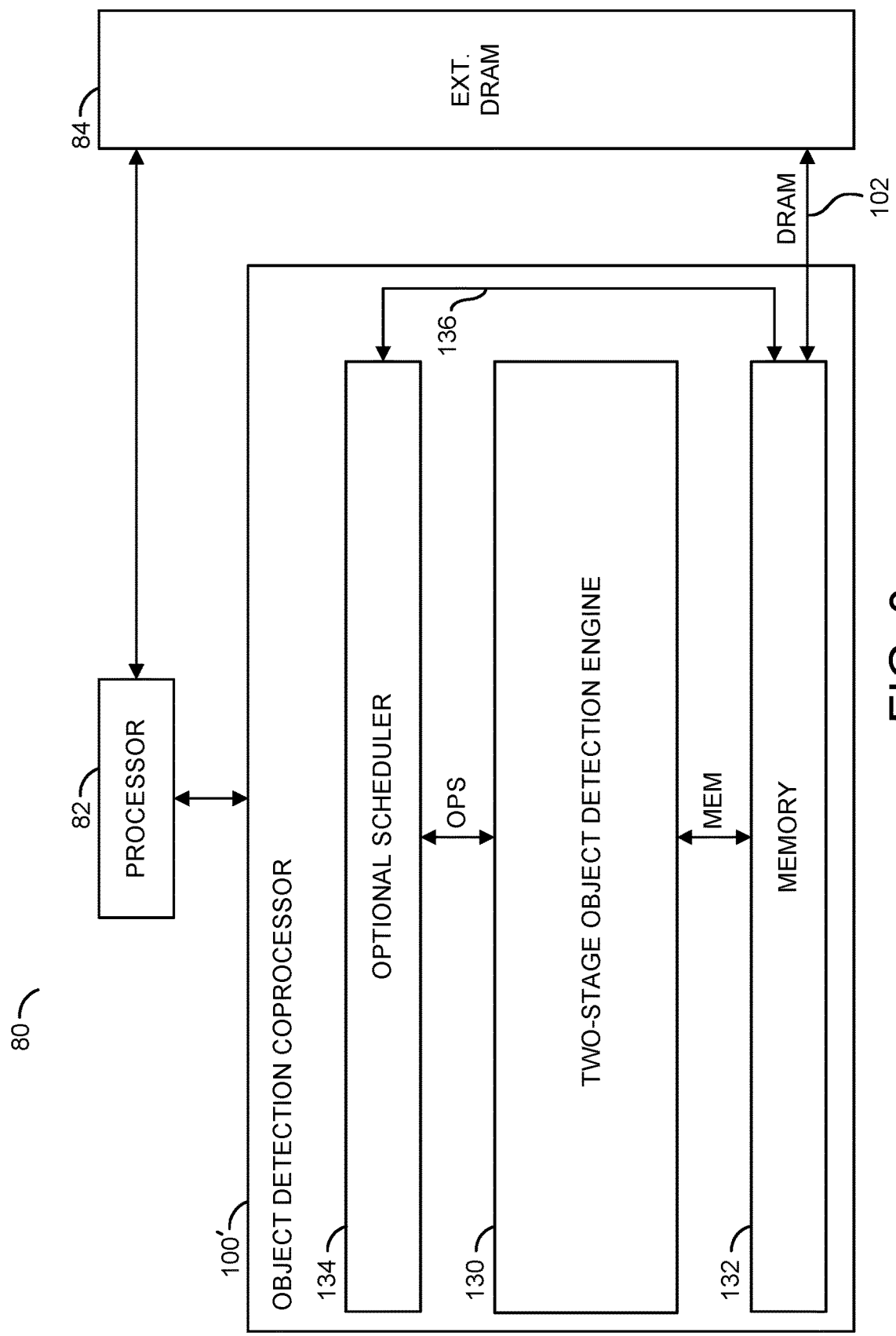
FIG. 3 is a diagram illustrating a context of another example implementation of a two-stage object detection technique in accordance with another example embodiment of the invention.

Referring to FIG. 3, a diagram of the system 80 is shown illustrating a context of another example implementation of a two-stage object detection technique in accordance with an embodiment of the invention. In an example, the system (or apparatus) 80 may be implemented as part of a computer vision system, an automated driver assistance system, and/or an autonomous vehicle system. In various embodiments, the system 80 may be implemented as part of a camera, a computer, a server (e.g., a cloud server), a smart phone (e.g., a cellular telephone), a personal digital assistant, or the like. In another example embodiment, the system 80 generally comprises the block (or circuit) 82, the block (or circuit) 84, and a block (or circuit) 100'.

The circuit 82 may implement a processor circuit. In some embodiments, the processor circuit 82 may be a general purpose processor circuit. The processor circuit 82 may be operational to interact with the circuit 84 and the circuit 100' to perform various processing tasks. The circuit 84 may implement a dynamic random access memory (DRAM) circuit. The DRAM circuit 84 is generally operational to store multidimensional arrays of input data elements and various forms of output data elements. The DRAM circuit 84 may exchange the input data elements and the output data elements with the processor circuit 82 and/or the circuit 100'. The signal DRAM) may be exchanged between the circuit 84 and the circuit 100' (e.g., via the memory bus 102). The signal DRAM may transfer data between the circuits 84 and 100'. In an example, the DRAM circuit 84 may store image data of an image pyramid search space.

In an example, the circuit 100' may be configured to perform a two-stage object detection process in accordance with an example embodiment of the invention in response to one or more commands and or parameters and using image data from the DRAM circuit 84. In an example, the processor 82 may be configured to provide the commands and/or parameters to the circuit 100'.

In an example, the circuit 100' may be implemented as a coprocessor circuit. The coprocessor circuit 100' generally implements a two-stage object detection engine that includes its own dedicated memory, data paths, and memory interface. The coprocessor circuit 100' is generally operational to perform the two-stage object detection process in accordance with example embodiments of the invention. In some embodiments, the coprocessor circuit 100' may be implemented solely in hardware. In other embodiments, the coprocessor circuit 100' may be implemented as a combination of software (or firmware) and hardware. In some embodiments implementing a combination of software and hardware, the coprocessor circuit 100' may be implemented as an embedded processor and a computer readable medium embodying computer executable instructions, which when executed by the embedded processor cause the embedded processor to perform a two-stage object detection process in accordance with an example embodiment of the invention.

In an example, the circuit 100' may implement one pass processing of selected regions in multiple scales (or levels) (e.g., of an image pyramid search space). The circuit 100' may have options for selecting a simple detector or a complex detector. In an example, the circuit 100' may have options for aggregated channel features (ACF) 2 level boosted or locally decorrelated channel features (LDCF) plus 5 level boosted detectors. In an example, the circuit 100' may be configured to output scores for candidates after non-maximum suppression (NMS) processing that have scores above a software (or parameter) specified threshold.

In an example, software may be configured to implement the two pass object detection process by having the coprocessor 100' perform the first pass with the ACF/2 level detector (classifier), selecting the best results, and then having the coprocessor 100' perform the LDCF/5 level classifier around each of the best results. In various embodiments, some functions may be moved between hardware and software. In an example, the hardware may be configured to process only one scale at a time, and the software may be configured to give commands to process each scale. In another example, the hardware may be configured to perform the entire processing scheme with a single command, at a cost of less flexibility in the software.

Another tradeoff that may be made is a number of classifiers processed by a particular implementation. In an example, the circuit 100' may be configured to perform processing of a multiple (e.g., 2, 5, 100, 332, etc.) different classifiers to the sliding window to allow different types of objects to be detected in the same pass. Alternatively, the circuit 100' may be configured to provide only one type of object detection at a time. In another example, a special purpose processor may be implemented that executes the entire two-stage object detection process in software on a general purpose processor.

In an example, the circuit 100' may comprise a circuit (or module) 130 and a circuit (or module) 132. The circuit 130 may implement a two-stage object detection engine. The circuit 132 may implement a memory circuit. The two-stage object detection engine 130 may be configured to perform the two-stage object detection process in accordance with example embodiments of the invention. The memory circuit 132 may be configured to store all, a portion, or portions of the input data elements and output data elements utilized and/or generated by the two-stage object detection engine 130. The input data elements may be received from the DRAM circuit 84 via the memory bus 102. The output data elements may be sent to the DRAM circuit 84 via the memory bus 102.

In embodiments implementing software control of the two passes of the two-stage objection process, either the processor 82 may control operation of the two-stage object detection engine 130 or an optional scheduler circuit 134 may be implemented to control operation of the two-stage object detection engine. An optional path 136 may implement a transfer path internal to the coprocessor 100'. The transfer path 136 may be operational to move data from the optional scheduler circuit 134 to the memory 132. The transfer path 136 may also be operational to move data from the memory 132 to the optional scheduler circuit 134.

Figure 4:
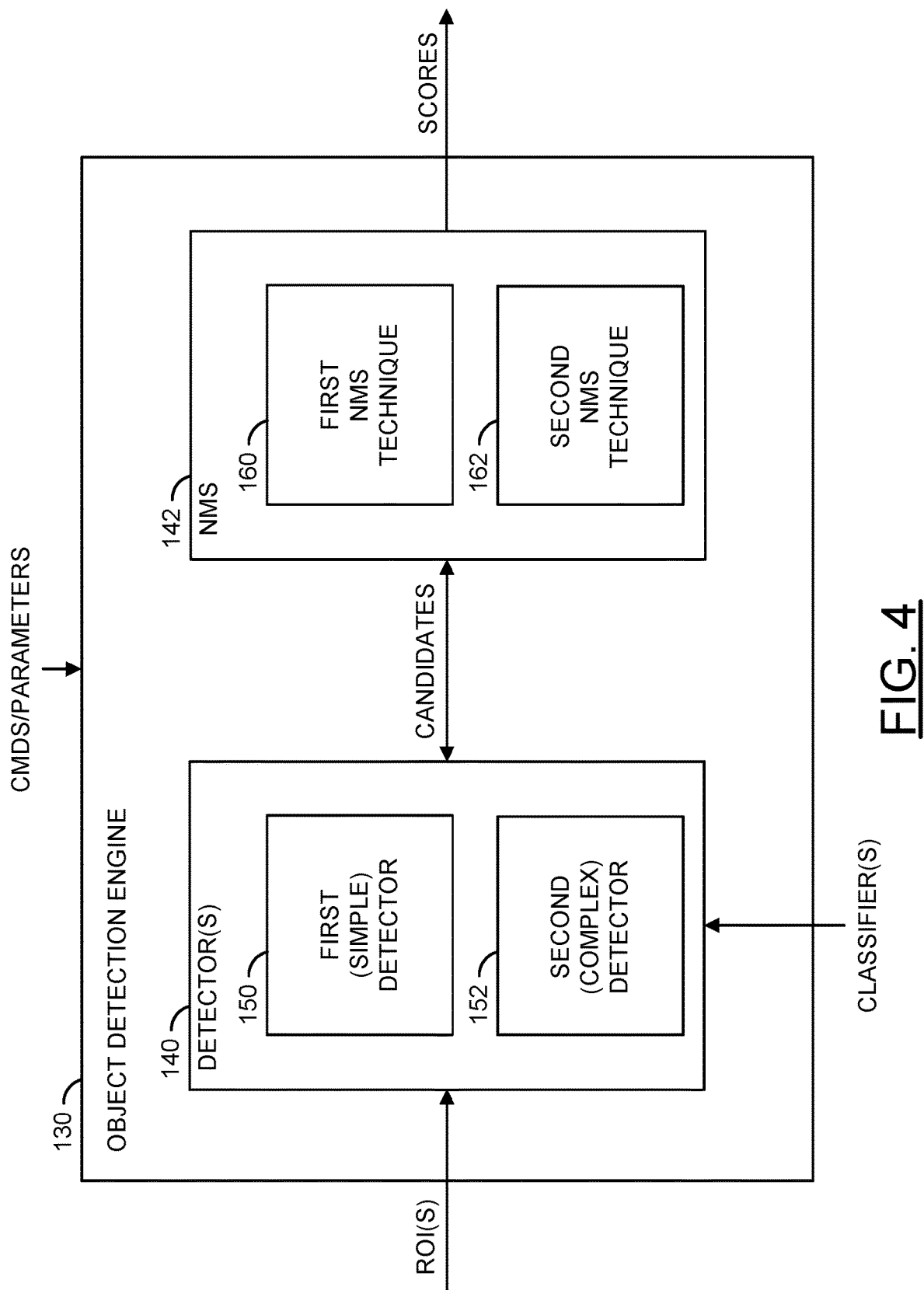
FIG. 4 is a diagram illustrating a generic implementation of an example two-stage object detection engine of FIG. 3.

Referring to FIG. 4, a diagram is shown illustrating a generic implementation of an example two-stage object detection engine of FIG. 3. In an example, the circuit 130 may implement a two-stage object detection scheme in accordance with an example embodiment of the invention. In an example, the circuit 130 may be configured to generate scores for object candidates (e.g., SCORES) in response to a number of commands and/or parameters (e.g., CMDS/PARAMETERS), one or more classifiers (e.g., CLASSIFIER(S)), and one or more regions of interest (e.g., ROI(s)). In an example, the CMDS/PARAMETERS may be configured to specify types of detectors, types of non-maximum suppression, non-maximum suppression thresholds, and/or classifiers to be applied to the one or more regions of interest. In various embodiments, the two-stage object detection scheme may be implemented by hardware or by a combination of software and hardware.

In various embodiments, the circuit 130 may comprise a circuit (or module) 140 and a circuit (or module) 142. The circuit 120 may implement a two-stage object detection process in accordance with an example embodiment of the invention. The circuit 142 may implement one or more non-maximum suppression techniques.

In an example, the circuit 140 may apply a first (simple) detector 150 over one or more regions of interest (ROIs) as part of the first stage of the two-stage object detection process. Then, in the second stage, the circuit 140 may apply a second (complex) detector 152 on the best candidates from the first stage. In an example, the circuit 140 may implement processing of selected regions in multiple scales (or levels) of an image pyramid search space. In another example, the circuit 140 may implement processing of selected regions in a single scale (or levels). In an example, the circuit 140 may be configured to perform processing of multiple (e.g., 2, 5, 100, 332, etc.) different classifiers to the sliding window to allow different types of objects to be detected in the same pass. Alternatively, the circuit 140 may be configured to provide only one type of object detection at a time.

In the first stage, the circuit 142 may apply a first non-maximum suppression (NMS) technique 160 to results of the first detector 150. In an example, the NMS technique 160 may utilize a diamond shaped suppression region. In the second stage, candidates from the second stage detector 152 may be sent to the memory 132 or the circuit 142 may apply a second non-maximum suppression (NMS) technique 162 to the results of the second stage detector 152. In an example, the NMS technique 162 may utilize a standard NMS technique. In another example, the circuit 142 may apply the same NMS technique to both stages of the object detection process. The two-stage process may provide accuracy close to running the complex detector 152 over the one or more regions of interest, but with much better performance.

Figure 5:
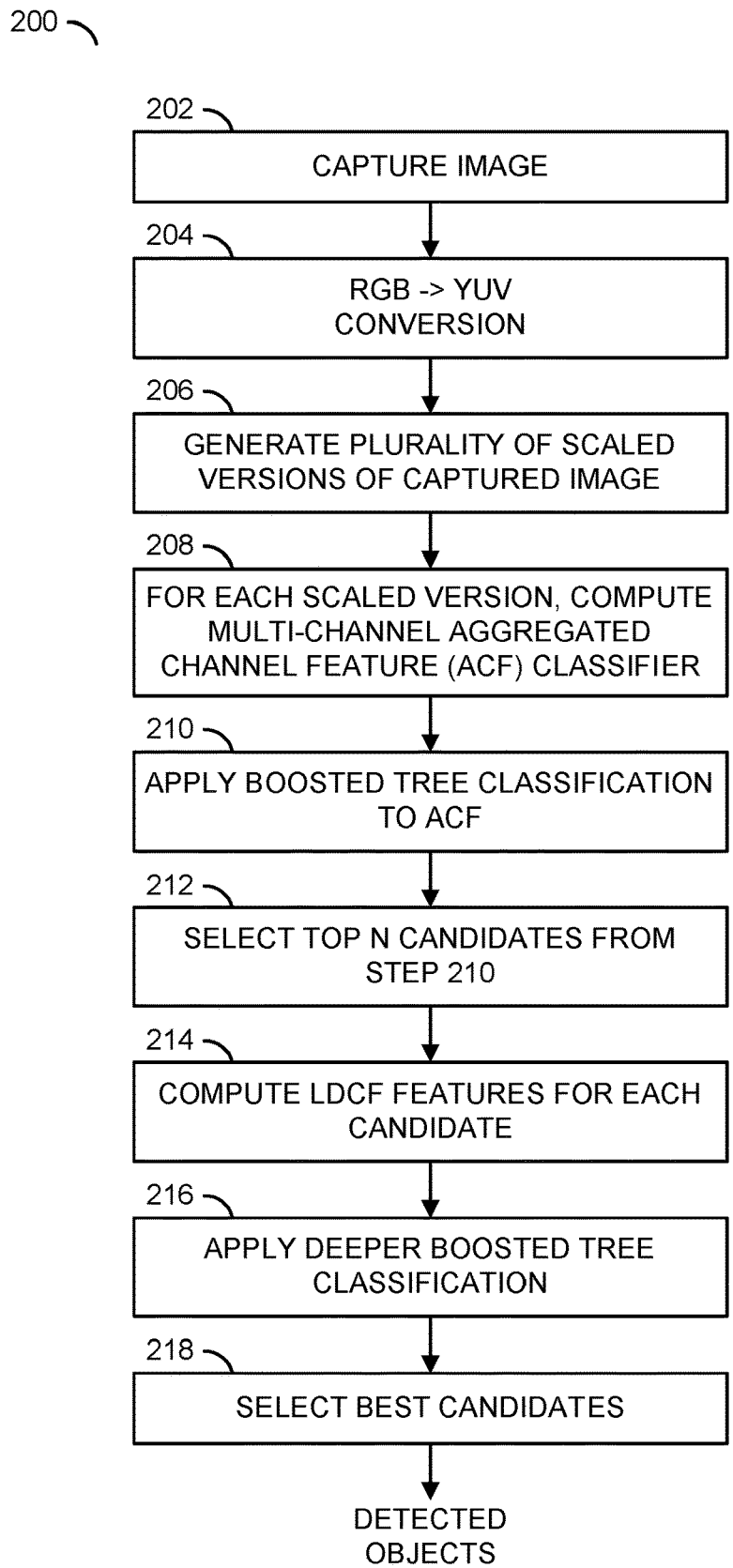
FIG. 5 is a flow diagram illustrating an example process in accordance with an example embodiment of the invention.

Referring to FIG. 5, a flow diagram of a process 200 is shown illustrating an example data flow in accordance with an example embodiment of the invention. The process (or method) 200 generally implements a two-stage object detection scheme in accordance with an example embodiment of the invention. In an example embodiment, the process 200 may comprise a step (or state) 202, a step (or state) 204, a step (or state) 206, a step (or state) 208, a step (or state) 210, a step (or state) 212, a step (or state) 214, a step (or state) 216, and a step (or state) 218. In an example embodiment, the steps 208-212 may implement a first stage of the two-stage object detection scheme and the steps 214-218 may implement a second stage of the two-stage object detection scheme.

The process 200 generally begins in the step 202. In the step 202, the process 200 may capture an image (e.g., using a video camera or some other image sensor). From the step 202, the process 200 moves to the step 204. In the step 204, the process 200 may perform a color space conversion (e.g., RGB->YUV). The step 204 may also comprise other types of image processing (e.g., white balance, motion compensation, noise reduction, color correction, etc.). The process 200 then moves to the step 206.

In the step 206, the process 200 may construct an image pyramid by scaling the original captured image to obtain a number (e.g., 10, 30, 50, etc.) of different levels. The image pyramid generally provides a scale space in which lower levels with high image resolution may be used to detect small objects, while higher levels may be used to detect large objects. The number of levels constructed may be varied to meet the design and/or performance criteria of a particular application. The process 200 then moves to the step 208.

In the step 208, the process 200 may apply a first, simple detector to each level of the image pyramid. In an example embodiment, the process 200 may compute a multi-channel aggregated channel features (ACF) representation (or classifier) of each level of the image pyramid. The computations for each of the levels may be performed in parallel or serially. The result of the multi-channel ACF is generally referred to as a feature pyramid. In an example embodiment, the process 200 may construct a 10-channel ACF representation at each level. The process 200 then moves to the step 210. In the step 210, the process 200 may apply boosted tree classification to the multi-channel ACF representations. In an example, boosting is generally used to train a cascade of weak decision trees to form a strong classifier for distinguishing object candidates from the background. The process 200 then moves to the step 212, where a predetermined number (e.g., N) of the top candidates from the step 210 are selected. In an example, the top 100 (e.g., N=100) remaining detections with highest detection scores may be selected as the candidates/proposals for the next (second) stage of detection. The process 200 then moves to the step 214.

In the step 214, the process 200 may apply a second, more complex detector to the N selected candidates. In an example embodiment, the process 200 may apply a detector that uses local decorrelation for improved object detection. In an example, the process 200 may compute locally decorrelated channel features (LDCF) for each candidate from the step 210. The process 200 then moves to the step 216, where the process 200 applies a deeper boosted tree classification to the LDCF representations from the step 214. The process 200 then moves to the step 218 where the best candidates are selected for subsequent processing (e.g., as detected objects).

Referring to FIG. 6, a flow diagram of a process 220 is shown illustrating an example two-stage object detection process in accordance with an example embodiment of the invention. In an example embodiment, the process (or method) 220 may comprise a step (or state) 222, a step (or state) 224, a step (or state) 226, and a step (or state) 228. The process 220 generally begins in the step 222. In the step 222, the process 220 may generate a score map for each level of a previously constructed image pyramid. In an example, the scores contained in each of the score maps may represent a likelihood that a corresponding pixel in the corresponding image data is a reference point for a region of a predetermined size containing a particular object or feature. However, other scoring operations may be implemented accordingly to meet the design criteria of a particular implementation.

In various embodiments, the score maps may be generated as part of a first stage of the two-stage object detection process. In an example, the first stage detection may be implemented by applying a simple detector over regions of interest in the images of the image pyramid. In an example embodiment, a small and simpler detector (e.g., trained with 128 depth-2 weak decision tree classifiers) may be applied across each level of the feature pyramid. The first stage aims to quickly reject most of the easy false positives with small computational cost. At each level, the result is a score map that estimates probability of object or not object at each position and the corresponding scale. From the step 222, the process 220 moves to the step 224.

In the step 224, the process 220 may apply non-maximum suppression (NMS) to the score maps generated in the step 222. Despite a majority of the background having been pruned, there may still be tens of thousands of hits remaining. Non-maximum suppression may be applied to reduce the number of detections. However, applying traditional standard NMS to tens of thousands of bounding boxes may be extremely inefficient. In various embodiments, a novel sliding-window based NMS may be applied instead of the standard NMS. In an example embodiment, a sliding window (e.g., 13×5) with a diamond-shaped region of interest (ROI) may be applied at each level of the image pyramid. The center pixel suppresses any other pixels with a lower detection score within the ROI. The number of detections may be greatly reduced after application the sliding-window based NMS procedure. Before moving to the step 226, the process 222 generally selects a predetermined number (e.g., N=100) of the top remaining detections with highest detection scores as the candidates/proposals for the next (second) stage of detection.

In the step 226, the process 220 generates estimates of locations and scales of bounding boxes of objects by applying a second stage detector to the predetermined number of candidates/proposals from the step 224. The second-stage generally focuses on distinguishing objects from difficult false positives that cannot be rejected by the first stage detector. In various embodiments, the second stage uses a more powerful detector (e.g., trained with 4096 depth-5 weak decision tree classifiers). In addition to the predetermined number of candidates/proposals produced by first-stage, the second-stage detector may also be applied to a 3×3 2D region around each proposal in the scale-space in order to search for a refined estimate of the location and scale of the bounding box. The second stage detection generally results in a collection of better classified and more accurately localized bounding boxes around the objects of interest in the image. The process 200 then moves to the step 228. In the step 228, final detections are generated by applying standard NMS to the bounding boxes output by second stage.

Figure 7:
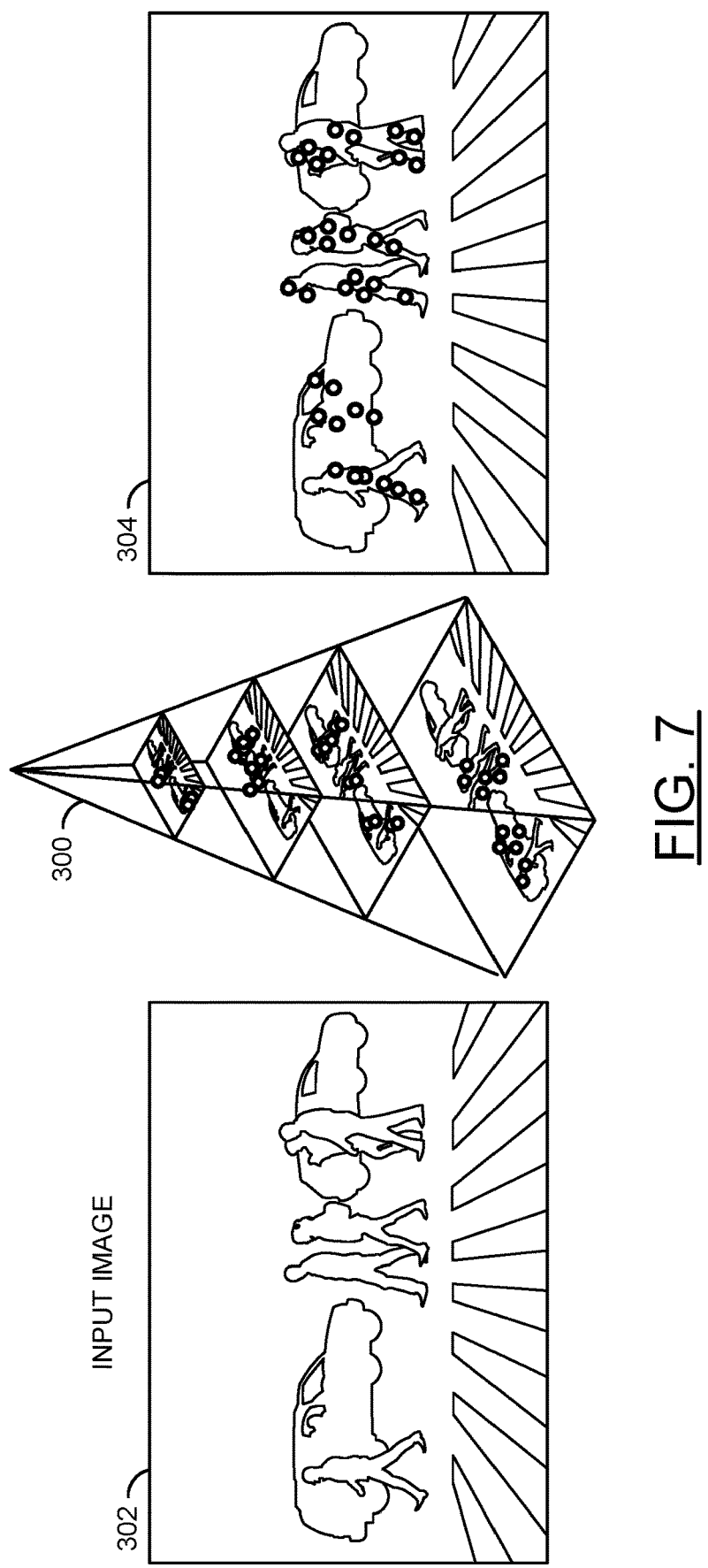
FIG. 7 is a diagram illustrating an example of raw detections in a search space using a first-stage object detection in accordance with an example embodiment of the invention.

Referring to FIG. 7, a diagram is shown illustrating an example first-stage detection in accordance with an example embodiment of the invention. In an example, an image pyramid search space 300 may be generated from an original captured input image 302. Each level of the image pyramid search space 300 is a scaled version of the original captured input image 302. The image pyramid search space 300 is generally constructed by scaling the original captured input image 302 to obtain a number of different levels. In an example, the image pyramid search space 300 generally provides a scale space in which lower levels with high image resolution may be used to detect small objects, while higher levels may be used to detect large objects. The number of levels constructed may be varied to meet the design and/or performance criteria of a particular application.

In the first detection stage, a small and simpler detector may be applied across each level of the image pyramid search space 300. In an example, a detector trained with 128 depth-2 weak decision tree classifiers may be applied. The first stage detector is generally configured to quickly reject a majority of easy false positives at a small computational cost. At each level, the first stage detection may produce a score map that estimates a probability of being an object or not an object at each position and the corresponding scale. In an example, the detections may be visualized as centers (circles) of respective bounding boxes in the image pyramid search (or scale) space 300. The detections may be visualized also as centers (circles) of respective bounding boxes in the original captured input image space (as illustrated by an image 304).

Figure 8:
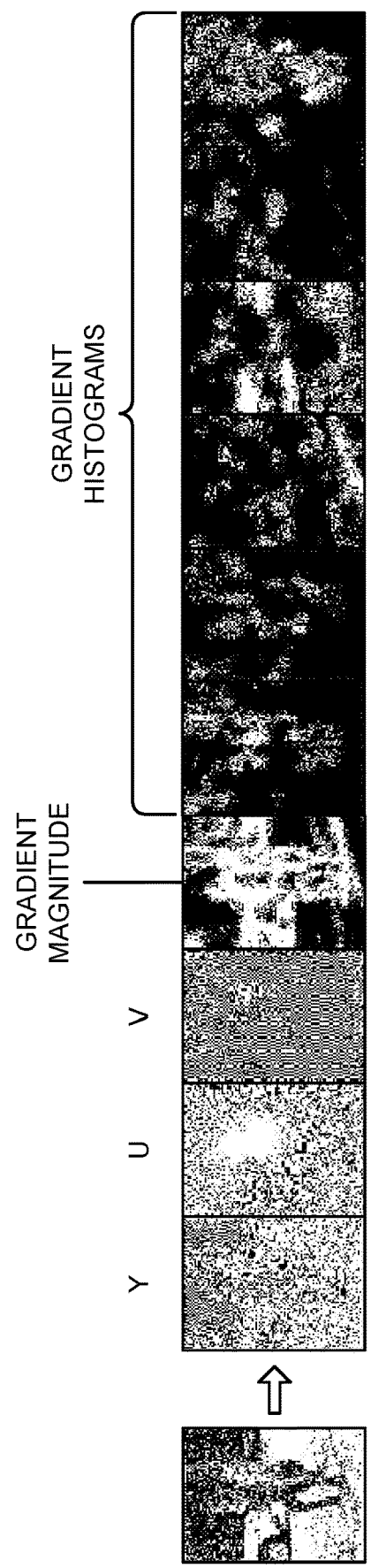
FIG. 8 is a diagram illustrating an example of multiple channel features generated from an image of a search space.

Referring to FIG. 8, a diagram is shown illustrating an example of an aggregated channel features (ACF) classifier with 10 channels. In an example embodiment, a multi-channel ACF may be computed for each level of the image pyramid. In an example, the multiple channels may include a number of color channels, a normalized gradient magnitude, and a plurality of histogram of oriented gradients (HOGs). In an example implementing 10 channels, the channels may comprise Y, U, and V color channels (e.g., converted from the RGB image) and six HOG channels. In an example, each channel may be down-sampled spatially (e.g., by a factor of 4). In various embodiments, the multi-channel ACF may be computed using either proprietary or conventional techniques.

Figure 9:
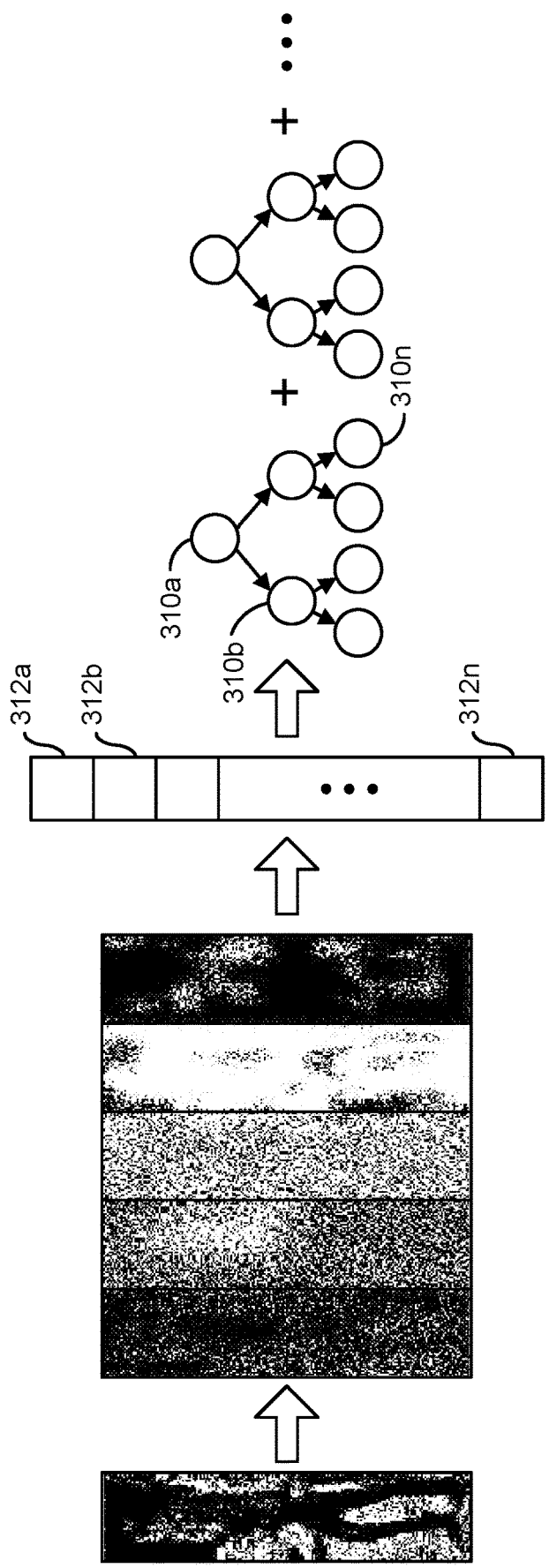
FIG. 9 is a diagram illustrating an example aggregated channel features and boosted tree classification scheme in accordance with an example embodiment of the invention.

Referring to FIG. 9, a diagram is shown illustrating an example aggregated channel features (ACF) and boosted tree classification scheme in accordance with an example embodiment of the invention. During the first detection stage, a sliding window may scan over each level of the image pyramid and a decision made whether the current window belongs to an object or the background. Each node (e.g., 310a-310n) of the decision tree selects a feature (e.g., 312a-312n), which is a single pixel lookup in the aggregated channels. In an example embodiment, the ACF features are generally computed directly in hardware. Boosting may be used to train a cascade of weak decision trees to form a strong classifier for distinguishing an object from the background.

Figure 10:
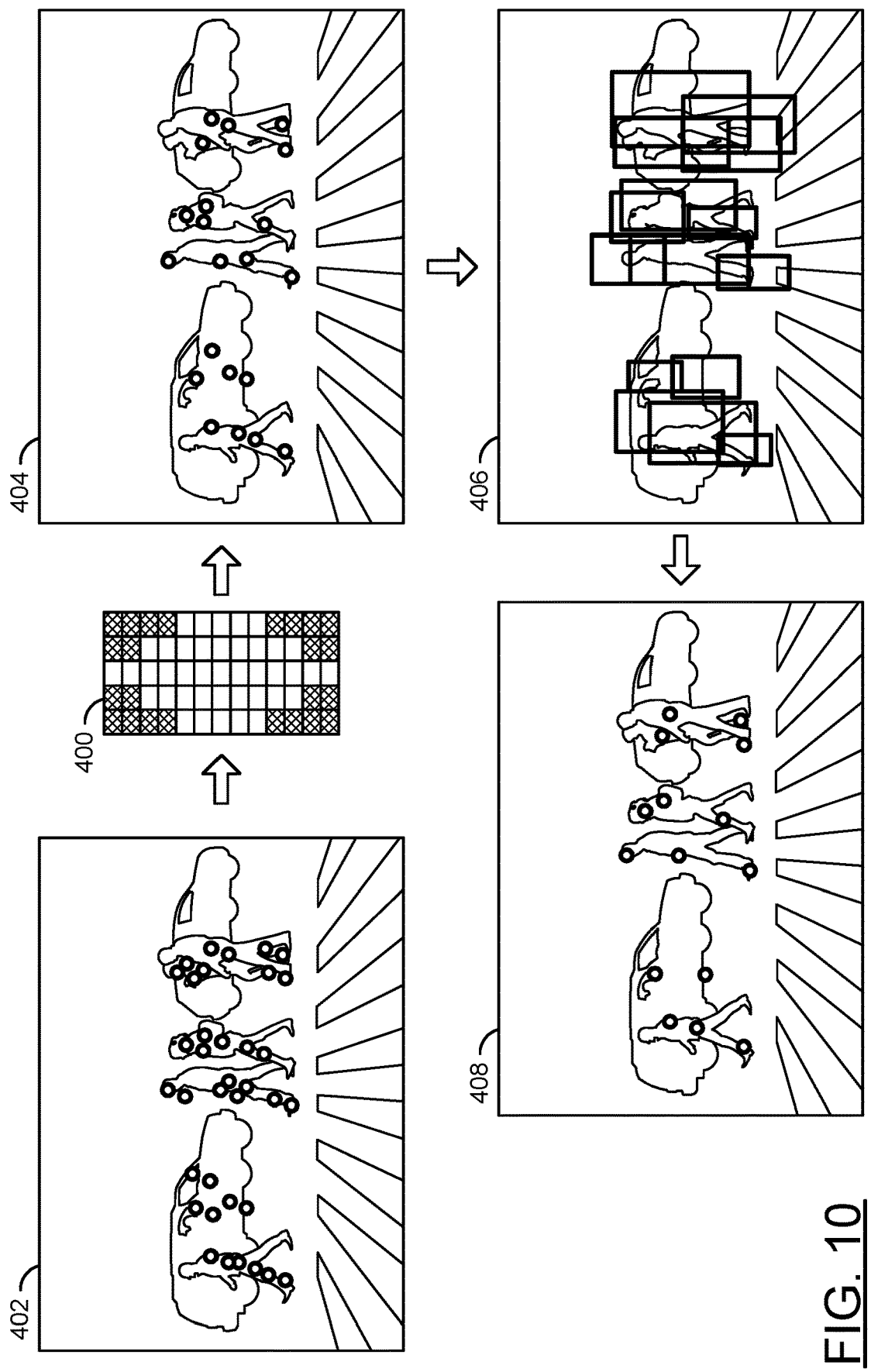
FIG. 10 is a diagram illustrating an example of applying a sliding-window based non-maximum suppression scheme to raw detections of the first-stage detection in accordance with an example embodiment of the invention.

Referring to FIG. 10, a diagram is shown illustrating an example of applying a sliding-window based non-maximum suppression (NMS) scheme to raw detections of the first detection stage in accordance with an example embodiment of the invention. Despite the majority of the background having been pruned, there may still be tens of thousands of hits remaining. Applying traditional standard NMS to tens of thousands of bounding boxes may be extremely inefficient. Instead, a novel sliding-window based NMS may be applied. In an example embodiment, the sliding-window based NMS in accordance with an example embodiment of the invention may apply a sliding window 400, comprising a diamond-shaped region of interest (ROI), at each level of the image pyramid 300.

In an example embodiment, the sliding window 400 may be implemented as a rectangle (e.g., 13×5 pixels) with the diamond-shaped region of interest (ROI) (or suppression region) excluding six pixels at each corner. The center pixel of the suppression region may be used to suppress any other pixels with a lower detection score within the ROI. The sliding-window based NMS procedure in accordance with an example embodiment of the invention may reduce the number of detections significantly. For example, using the sliding window 400 to apply the sliding-window based NMS procedure to the first pass detection illustrated an image 402 may result in a reduction in the number of detections.

After NMS, the first stage may finish by selecting a number of the detections with highest detection scores as the final candidates/proposals for the next (second) stage of detection (illustrated by the image 404). In an example, the top 100 detections may be selected. However, other numbers of detections may be selected to meet design criteria of a particular implementation. The top detections may be visualized as respective bounding boxes (illustrated by the image 406). The top detections may also be visualized as the centers (circles) of the respective bounding boxes (illustrated by the image 408) in both the scale space 300 and the original captured input image space 302.

Figure 11:
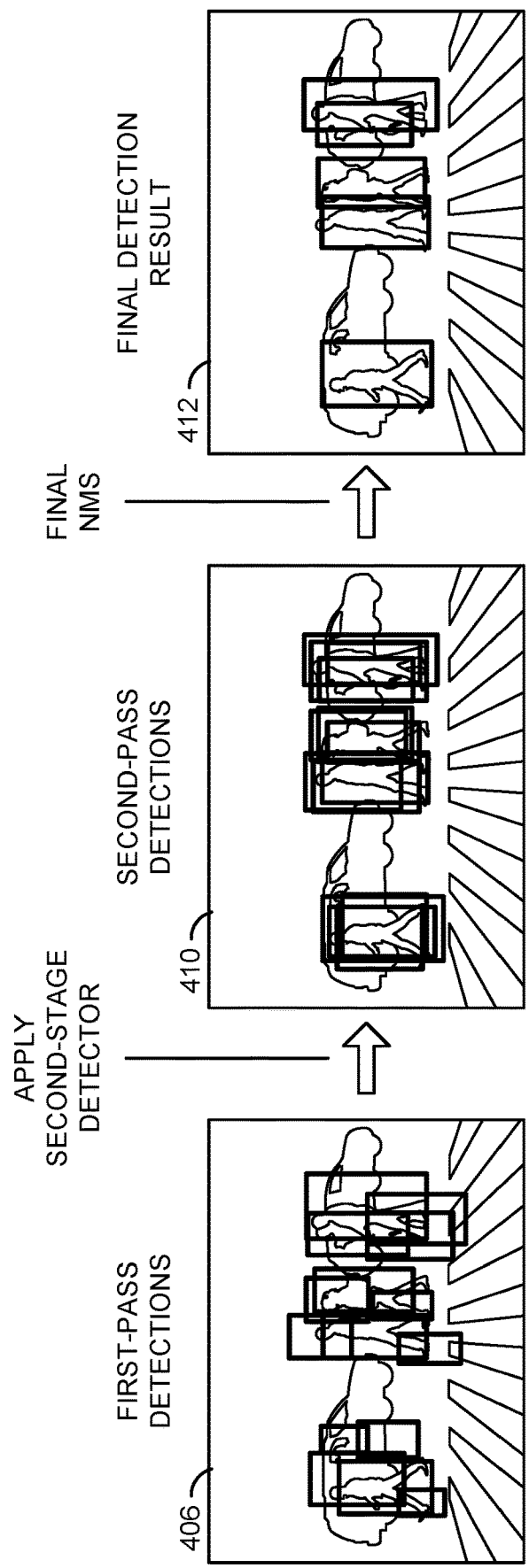
FIG. 11 is a diagram illustrating application of an example second-stage object detection in accordance with an example embodiment of the invention.

Referring to FIG. 11, a diagram is shown illustrating an example second-stage detection in accordance with an example embodiment of the invention. The second detection stage generally focuses on distinguishing objects from difficult false positives that cannot be rejected by the simple detector of the first detection stage. The second detection stage generally uses a more powerful detector. In an example, a detector trained with 4096 depth-5 weak decision tree classifiers may be applied. In addition to the candidates/proposals produced by the first detection stage, the second stage detector may also search a 2D local neighborhood around each first stage candidate/proposal in the scale space.

In an example embodiment, the second stage detector may be applied to a 2D region (e.g., 3×3, etc.) around each candidate/proposal in the scale space in order to search for a refined estimate of the location and scale of the bounding box. The result is a collection of better classified and more accurately localized bounding boxes around the objects of interest in the image. In an example, applying the second stage detector to the first stage detections illustrated in the image 406 may result in second-pass detections as illustrated in an image 410. In a final step, final detections may be generated by applying standard NMS to the bounding boxes prior to output by the second detection stage. In an example, an image 412 illustrates an example result of applying standard NMS to the second-pass detections illustrated in the image 410.

The two-stage object detection scheme described above generally achieves significant algorithmic speed-ups over existing detection methods while maintaining comparable detection performance. The two-stage object detection scheme described above is embedded device friendly and broadly applicable to any sliding-window based object detectors and any object categories.

Figure 12:
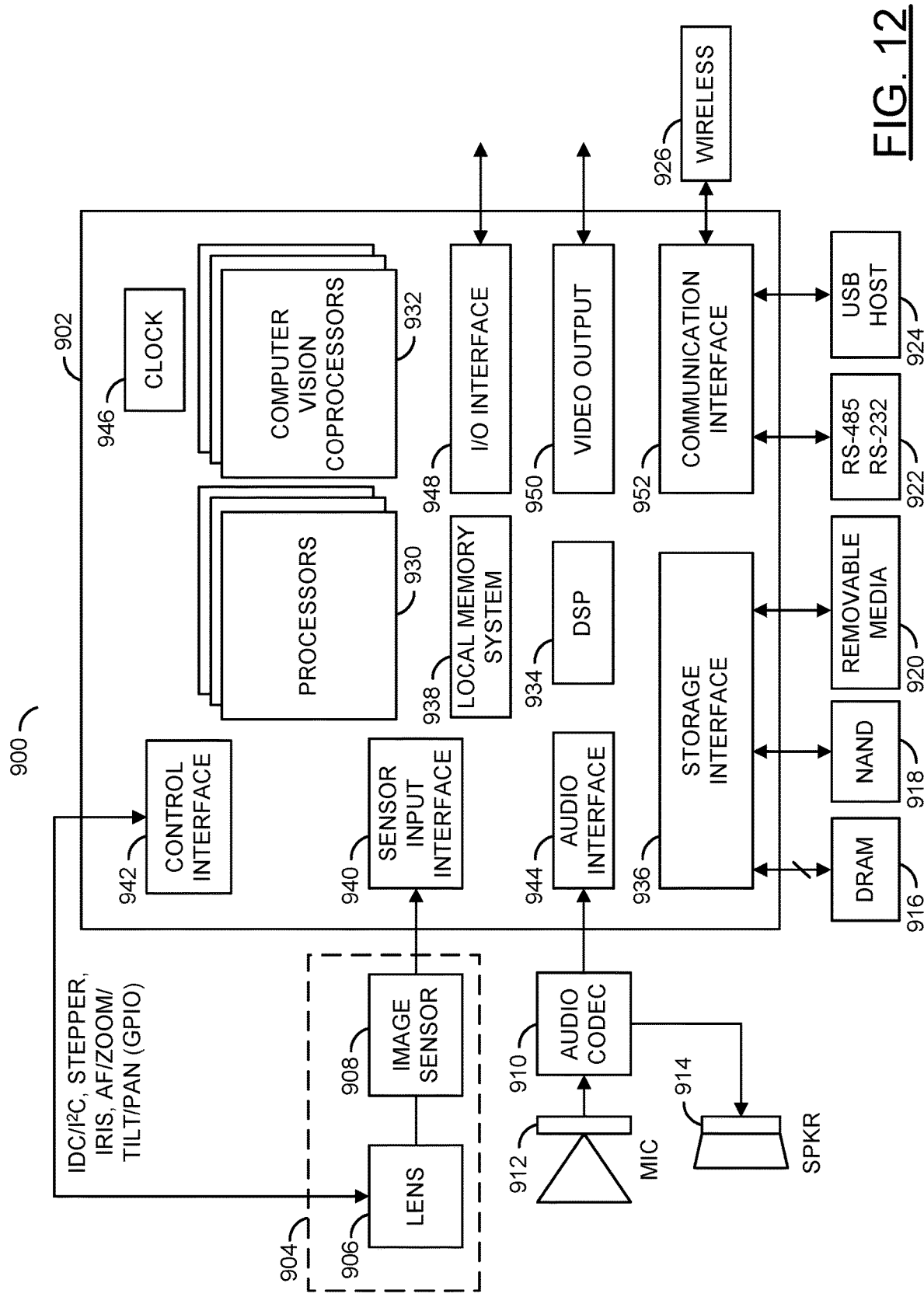
FIG. 12 is a diagram illustrating a camera system incorporating a two-stage object detection process in accordance with an example embodiment of the invention.

Referring to FIG. 12, a diagram of a camera system 900 is shown illustrating an example implementation of a computer vision system in accordance with an embodiment of the invention. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 12.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera 60. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera 60.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930, a number of blocks (or circuits) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The number of circuits 930 may be processor circuits. In various embodiments, the circuits 930 may include one or more embedded processors (e.g., ARM, etc.). The circuits 932 may implement a number of computer vision related coprocessor circuits. In an example, one or more of the circuits 932 may implement a two-stage object detection engine in accordance with an example embodiment of the invention. The circuit 934 may be a digital signal processing (DSP) module. In some embodiments, the circuit 934 may implement separate image DSP and video DSP modules. The circuit 936 may be a storage interface. The circuit 936 may interface the processor/camera circuit 902 with the DRAM 916, the non-volatile memory 918, and the removable media 920.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit (I²C) interface, a serial peripheral interface (SPI), and a pulse width modulation (PWM) interface. The circuit 944 may implement an audio interface (e.g., an I²S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module.

The circuit 952 may be a communication module. The circuits 930 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920).

In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the coprocessors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I²S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 952 may also include support for communicating using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 maybe configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel).

The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

The functions and structures illustrated in the diagrams of FIGS. 1 to 12 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
  a detector circuit; and
  a first processor configured to perform a two-stage object detection process utilizing said detector circuit, wherein (i) the detector circuit is configured to implement a simple detection stage and a complex detection stage, (ii) in said simple detection stage, a first type of object detection is applied to each image in a search space and a number of candidates are identified by applying a first non-maximum suppression technique, (iii) in said complex detection stage, a second type of object detection is applied to the candidates identified by the simple detection stage, and (iv) said first non-maximum suppression technique comprises a sliding-window non-maximum suppression technique utilizing a rectangular sliding window having a diamond shaped region of interest.

2. The apparatus according to claim 1, further comprising a second processor implementing said detector circuit, wherein:
said first processor is configured to generate a command to run said two-stage object detection process; and
said second processor is configured to (a) receive said command from said first processor and (b) perform said two-stage object detection process utilizing said detector circuit.

3. The apparatus according to claim 2, wherein said second processor comprises an embedded processor having a dedicated memory, data paths, and an external memory interface.

4. The apparatus according to claim 1, wherein said first processor and said detector circuit form part of at least one of a digital camera and a computer vision system.

5. The apparatus according to claim 1, wherein said first processor and said detector circuit form part of an object detection system of a vehicle.

6. The apparatus according to claim 1, wherein said two-stage detection process further comprises:
computing a score map for each image in a search space of scaled images using said first type of objection detection;
applying said first non-maximum suppression technique to said score maps;
computing estimates of location and scale of bounding boxes for the identified candidates using said second type of object detection; and
applying a second non-maximum suppression technique to the computed estimates.

7. The apparatus according to claim 1, wherein said two-stage detection process further comprises:
computing multi-channel aggregated channel features for a search space of scaled images;
applying a low depth boosted tree classification to the aggregated channel features;
selecting a predetermined number of candidates identified by the low depth boosted tree classification;
computing locally decorrelated channel features for the selected candidates;
applying a higher depth boosted tree classification to the locally decorrelated channel features; and
selecting a number of candidates identified by the higher depth boosted tree classification based upon one or more predetermined criteria.

8. The apparatus according to claim 7, wherein said search space of scaled images comprises an image pyramid or scale space.

9. The apparatus according to claim 8, wherein said search space of scaled images is generated by re-scaling a captured image to a plurality of levels.

10. A method of object or feature detection comprising the steps of:
in a first stage, applying a first type of object detection using a first detector to each image in a search space, applying a first non-maximum suppression technique to results of said first type of object detection, and selecting a number of candidates identified by said first non-maximum suppression technique, wherein said first non-maximum suppression technique comprises a sliding-window non-maximum suppression technique utilizing a rectangular sliding window having a diamond shaped region of interest; and
in a second stage, applying a second type of object detection using a second detector on a set of best candidates identified by the first stage, wherein (i) the first detector implements a simple detector and (ii) the second detector implements a complex detector.

11. The method according to claim 10, further comprising:
configuring an object detection circuit to apply at least one classifier of said first detector to one or more regions of interest in said first stage; and
configuring said object detection circuit to apply at least one classifier of said second detector to said set of best candidates identified by the first stage in said second stage.

12. The method according to claim 10, wherein:
said first stage comprises (i) computing multi-channel aggregated channel features for a plurality of scaled images, (ii) applying a low depth boosted tree classification to the aggregated channel features, and (iii) selecting a predetermined number of candidates identified by the low depth boosted tree classification; and
said second stage comprises (i) computing locally decorrelated channel features for the selected candidates from the first stage, (ii) applying a higher depth boosted tree classification to the locally decorrelated channel features, and (iii) selecting a number of candidates identified by the higher depth boosted tree classification based upon one or more predetermined criteria.

13. The method according to claim 12, wherein said plurality of scaled images comprises an image pyramid or scale space.

14. The method according to claim 12, further comprising generating said plurality of scaled images by re-scaling a captured image to a plurality of levels.

15. The method according to claim 10, wherein:
the first stage further comprises (i) computing a score map for each image in said search space using said first type of objection detection, (ii) applying said first non-maximum suppression technique to said score maps, and (iii) selecting a predetermined number of candidates identified by said first non-maximum suppression technique; and
said second stage further comprises (i) computing estimates of location and scale of bounding boxes for the selected candidates from the first stage using said second type of object detection and (ii) applying a second non-maximum suppression technique to the computed estimates.

16. A non-transitory computer readable medium embodying computer executable instructions, which when executed by an embedded processor cause the embedded processor to perform the steps of:
applying a first type of object detection using a first detector to each image in a search space of scaled images;
applying a first non-maximum suppression technique to results of said first type of object detection;
selecting a number of candidates identified by said non-maximum suppression technique; and
applying a second type of object detection using a second detector on said number of candidates identified by said first non-maximum suppression technique, wherein (i) the first detector implements a simple detector, (ii) the second detector implements a complex detector, and (iii) the first non-maximum suppression technique comprises a sliding-window non-maximum suppression technique utilizing a rectangular sliding window having a diamond shaped region of interest.

17. The non-transitory computer readable medium according to claim 16, further embodying computer executable instructions, which when executed by the embedded processor cause the embedded processor to perform the steps of:
- in a first stage, configuring an object detection circuit to apply at least one classifier of said first detector to one or more regions of interest; and
- in a second stage, configuring said object detection circuit to apply at least one classifier of said second detector to said number of candidates identified in the first stage.

18. The non-transitory computer readable medium according to claim 16, further embodying computer executable instructions, which when executed by the embedded processor cause the embedded processor to perform the steps of:
- in a first stage, (i) computing multi-channel aggregated channel features for a plurality of scaled images, (ii) applying a low depth boosted tree classification to the aggregated channel features, and (iii) selecting a predetermined number of candidates identified by the low depth boosted tree classification; and
- in a second stage, (i) computing locally decorrelated channel features for the selected candidates from the first stage, (ii) applying a higher depth boosted tree classification to the locally decorrelated channel features, and (iii) selecting a number of candidates identified by the higher depth boosted tree classification based upon one or more predetermined criteria.

19. The non-transitory computer readable medium according to claim 18, further embodying computer executable instructions, which when executed by the embedded processor cause the embedded processor to perform the step of:
- generating said plurality of scaled images by re-scaling a captured image to a plurality of levels.

20. The non-transitory computer readable medium according to claim 16, further embodying computer executable instructions, which when executed by the embedded processor cause the embedded processor to perform the steps of:
- in a first stage (i) computing a score map for each image in said search space using said first type of objection detection, (ii) applying said first non-maximum suppression technique to said score maps, and (iii) selecting a predetermined number of candidates identified by said first non-maximum suppression technique; and
- in a second stage (i) computing estimates of location and scale of bounding boxes for the selected candidates from the first stage using said second type of object detection and (ii) applying a second non-maximum suppression technique to the computed estimates.

* * * * *